(12) United States Patent
Takei

(10) Patent No.: US 8,599,127 B2
(45) Date of Patent: Dec. 3, 2013

(54) ELECTROPHORETIC DISPLAY DEVICE, DRIVING METHOD THEREOF, AND ELECTRONIC APPARATUS

(75) Inventor: Yoshiki Takei, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1210 days.

(21) Appl. No.: 12/482,699

(22) Filed: Jun. 11, 2009

(65) Prior Publication Data
US 2009/0322735 A1 Dec. 31, 2009

(30) Foreign Application Priority Data

Jun. 26, 2008 (JP) ................................. 2008-166974

(51) Int. Cl.
G09G 3/34 (2006.01)
G09G 5/00 (2006.01)
G06F 3/038 (2013.01)

(52) U.S. Cl.
USPC .......................................... 345/107; 345/214

(58) Field of Classification Search
USPC ................. 345/55, 84, 107, 204, 214
See application file for complete search history.

(56) References Cited

U.S. PATENT DOCUMENTS

| | | | | |
|---|---|---|---|---|
| 2002/0180688 A1* | 12/2002 | Drzaic et al. | | 345/107 |
| 2007/0024954 A1* | 2/2007 | Sakamoto | | 359/296 |
| 2007/0080927 A1* | 4/2007 | Zhou et al. | | 345/107 |
| 2007/0126693 A1* | 6/2007 | Johnson et al. | | 345/107 |
| 2008/0024431 A1* | 1/2008 | Ishii | | 345/107 |
| 2009/0309870 A1* | 12/2009 | Takei | | 345/214 |

FOREIGN PATENT DOCUMENTS

| | | |
|---|---|---|
| JP | 2006-98782 A | 4/2006 |
| JP | 2006-259243 A | 9/2006 |
| JP | 2007-206266 A | 8/2007 |

* cited by examiner

Primary Examiner — Jonathan Horner
(74) Attorney, Agent, or Firm — ALG Intellectual Property, LLC

(57) ABSTRACT

There is provided a method of driving an electrophoretic display device including a first substrate, a second substrate opposed to the first substrate, a plurality of microcapsules including electrophoretic particles, the plurality of microcapsules being arranged between the first substrate and the second substrate, a plurality of first electrodes formed on the plurality of microcapsules side of the first substrate, the plurality of first electrodes being arranged at a pitch equal to or smaller than an average diameter of the plurality of microcapsules in at least one direction, and a second electrode formed on the plurality of microcapsules side of the second substrate, the second electrode being opposed to the plurality of first electrodes. One or a plurality of the first electrodes are set as a driving unit. During removing a displayed image, the second electrode is in an electrically isolated condition. And electric potentials are applied to the plurality of the first electrodes such that the driving units adjacently located in at least one direction have different electric potentials.

15 Claims, 12 Drawing Sheets

FIG. 7A ST11
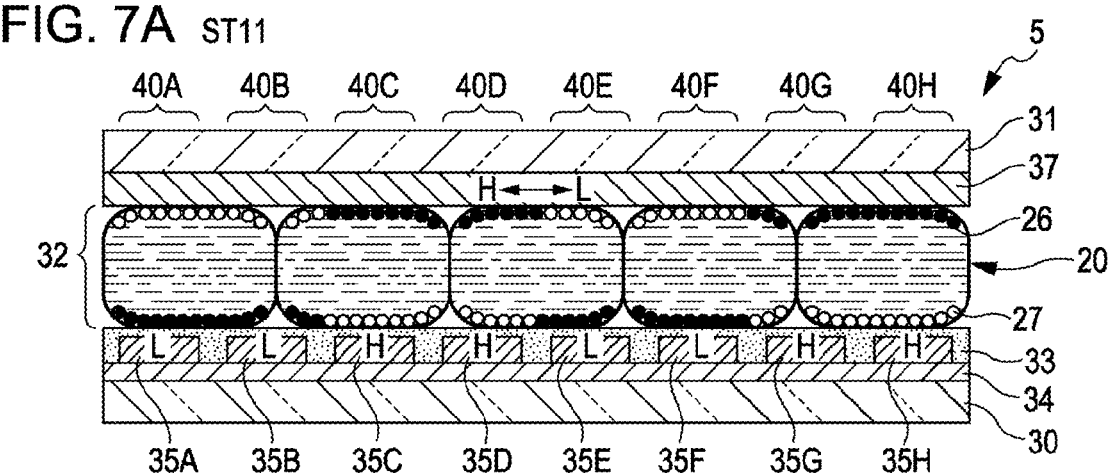
FIG. 7B ST13
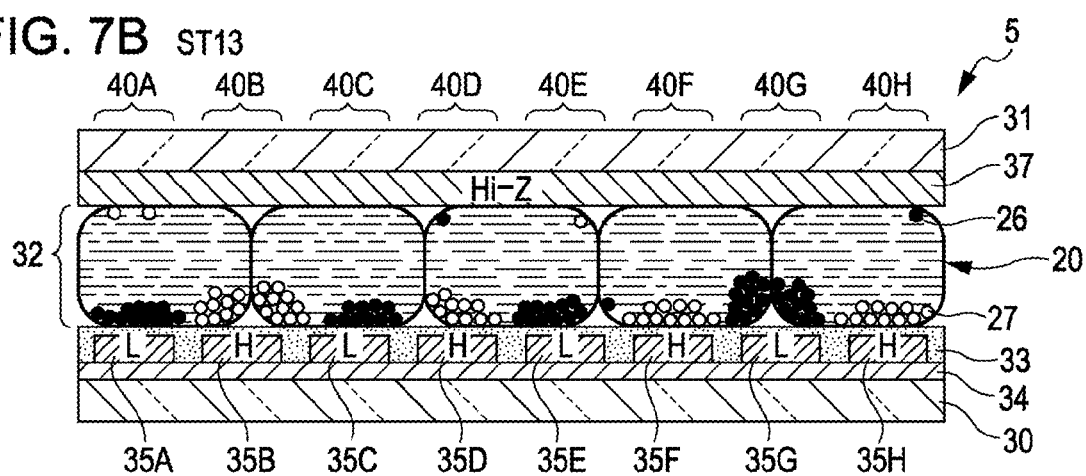
FIG. 7C ST14
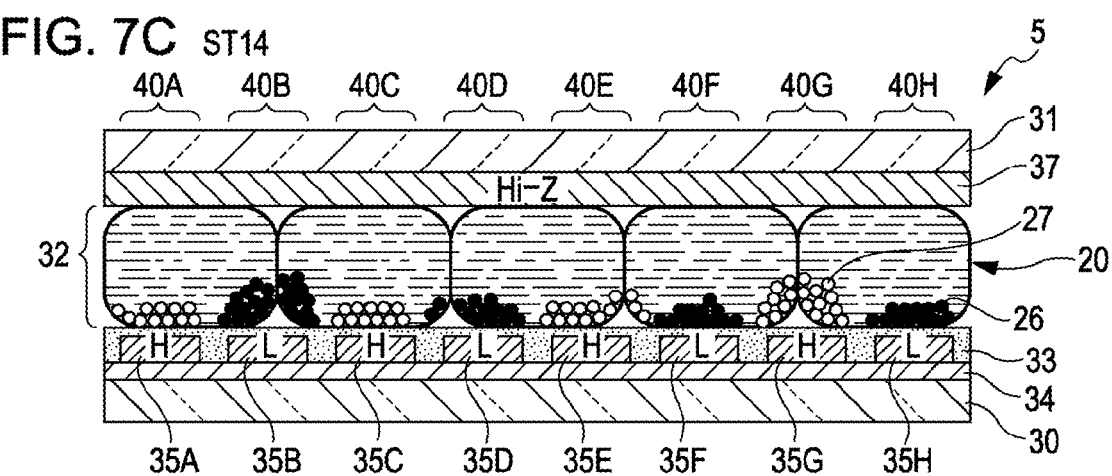

ELECTROPHORETIC DISPLAY DEVICE, DRIVING METHOD THEREOF, AND ELECTRONIC APPARATUS

BACKGROUND

1. Technical Field

The present invention relates to an electrophoretic display device, a driving method thereof, and an electronic apparatus.

2. Related Art

Electrophoretic display devices in which one type or a plurality of types of electrophoretic particles and a dispersion medium are enclosed between one pair of substrates have been known. In this type of the electrophoretic display devices, display is performed by applying a voltage between a transparent electrode formed on a display side substrate and a driving electrode formed on a rear side (a side opposite to the display surface) substrate so as to pull electrophoretic particles toward one electrode (for example, see JP-A-2006-259243). In addition, in this type of the electrophoretic display devices, in order to decrease afterimage, a removal method, in which an operation for displaying white in an entire display unit (entire white display) and an operation for black display in the entire display unit (entire black display) are performed, has been employed (see JP-A-2007-206266).

However, when the above-described removal method, in which the entire white display and the entire black display are repeated, is used, an uneven shape is visually recognized in the display unit in a stage in which the display surface blinks in the white color and the black color or the removal operation is insufficient, and whereby a user may have a feeling of discomfort.

SUMMARY

An advantage of some aspects of the invention is that it provides an electrophoretic display device and a driving method thereof capable of removing display without causing a user to have a feeling of discomfort.

According to a first aspect of the invention, there is provided a method of driving an electrophoretic display device formed by pinching an electrophoretic element, in which a plurality of microcapsules including electrophoretic particles is arranged, between a first substrate and a second substrate that are disposed to face each other. A plurality of first electrodes that is arranged at a pitch equal to or smaller than an average diameter of the plurality of microcapsules is formed in at least one direction on a side of the first substrate that is located on the electrophoretic element side, and a second electrode facing the plurality of first electrodes is formed on a side of the second substrate that is located on the electrophoretic element side. In addition, in removing a displayed image, the second electrode is in a state electrically cut off, one or a plurality of the first electrodes are set as one driving unit, and electric potentials are input to the plurality of the first electrodes such that the driving units adjacently located in at least one direction have different electric potentials.

According to the above-described driving method, in the removing of the image, electric fields of a horizontal direction (a substrate face direction) are generated between adjacent driving units by applying a voltage to the first electrodes in a state in which the second electrode is electrically cut off.

Here, in the electrophoretic display device to which this driving method is applied, the pitch of the first electrodes is equal to or shorter than the average diameter of the microcapsules. Accordingly, the boundary areas between the first electrodes are disposed within the plane areas of many microcapsules. Therefore, the electrophoretic particles located inside the microcapsule are moved in the horizontal direction in accordance with the electric fields so as to be pulled toward the first electrodes having the electric potential opposite to that of the particles.

As a result, by performing the removing of the image, the electrophoretic particles are scarcely disposed on the second electrode side. Thus, when the electrophoretic display device is viewed from the second substrate side, the gray display (a case where the electrophoretic particles are white particles and black particles) is represented. Accordingly, there is no display of blinking of the white color and the black color during the image removing operation, and thereby it can be prevented to cause a user to have a feeling of discomfort. In addition, even when the electrophoretic particles remain on the second substrate side in a stage in which image removal is insufficient, the background color is the gray color. Accordingly, an uneven shape of the afterimage is not visually recognized distinctively, and thereby the user does not have a feeling of discomfort.

In addition, the moving direction of the electrophoretic particles in the removing of the image is the horizontal direction that is a direction different from the moving direction of the electrophoretic particles for displaying an image. Accordingly, agitation of the electrophoretic particles located inside the microcapsule is sufficient. Therefore, image removal can be performed assuredly, and adherence and fixation of the electrophoretic particles to the second electrode side can be prevented effectively.

In the above-described method, it is preferable that the removing of the image includes: inputting a first electric potential to the first electrodes belonging to some driving units of the plurality of the driving units and inputting a second electric potential to the first electrodes belonging to the other driving units; and switching the first electric potential and the second electric potential so as to be input to the first electrodes belonging to the driving units.

In such a case, agitation of the electrophoretic particles inside the microcapsule can be performed more assuredly. As a result, the removing of the image can be performed more assuredly.

In the above-described method, it is preferable that an electric potential difference between the first electric potential and the second electric potential is approximately equivalent to a maximum electric potential difference between the first electrode and the second electrode at a time when an image displaying operation of the electrophoretic display device is performed.

In such a case, the electrophoretic particles can be agitated sufficiently, and thereby an image can be removed assuredly.

In the above-described method, some first electrodes of the plurality of the first electrodes may be configured to be in a state to be electrically cut off in the removing of the image. In such a case, while display in an area, in which the first electrode in a state electrically cut off is disposed, is maintained, display in other areas can be removed (partial removal).

Alternatively, electric potentials on the basis of the image signal corresponding to the currently displayed image may be configured to be input to some first electrodes among the plurality of first electrodes in the removing of the image. In such a case, the displayed image is overwritten in a pixel into which the image signal corresponding to the displayed image is written. On the other hand, images are removed in other pixels. As a result, a partial removal operation as described above can be performed.

In the above-described method, it is preferable that the driving unit is set such that the area of the driving unit is larger than 0.25 times an average plane area of the microcapsules and is equal to or smaller than the average plane area.

When the area of the driving unit is larger than the average plane area of the microcapsule, the probability that the boundary area of the adjacent driving units is not disposed within the plane area of the microcapsule becomes high. Accordingly, a reaction for moving the electrophoretic particles in the horizontal direction cannot be easily acquired. On the other hand, when the area of the driving unit is equal to or smaller than 0.25 times the average plane area of the microcapsule, four or more driving units are disposed within the plane area of the microcapsule on the average. Accordingly, uneven distribution of the electrophoretic particles within the microcapsule becomes marked, and thereby the display quality may deteriorate.

In the above-described method, it is preferable that the driving unit is set such that a shortest pitch of the driving units is larger than 0.5 times an average diameter of the microcapsules and is equal to or smaller than the average diameter.

The shortest pitch of the driving units indicates a shortest pitch of a plurality of pitches for a case where the plurality of pitches in the arrangement direction of the driving units is different in accordance with the driving units or the shapes of the first electrodes.

When the pitch of the driving unit is larger than the average diameter of the microcapsule, the probability that the boundary area of the adjacent driving units is not disposed within the plane area of the microcapsule becomes high. Accordingly, a reaction for moving the electrophoretic particles in the horizontal direction cannot be easily acquired. On the other hand, when the pitch of the driving unit is equal to or smaller than 0.5 times the average diameter of the microcapsule, four or more driving units are disposed within the plane area of the microcapsule on the average. Accordingly, uneven distribution of the electrophoretic particles within the microcapsule becomes marked, and thereby the display quality may deteriorate.

According to a second aspect of the invention, there is provided an electrophoretic display device that is formed by pinching an electrophoretic element, in which a plurality of microcapsules including electrophoretic particles is arranged, between a first substrate and a second substrate that are disposed to face each other. A plurality of first electrodes that is arranged at a pitch equal to or smaller than an average diameter of the plurality of microcapsules is formed in at least one direction on a side of the first substrate that is located on the electrophoretic element side, and a second electrode facing the plurality of first electrodes is formed on a side of the second substrate that is located on the electrophoretic element side. The electrophoretic display device includes a control unit that controls electric potentials of the plurality of first electrodes and the second electrode. In addition, the control unit, in an image removing period in which a displayed image is removed, controls the second electrode to be in a state electrically cut off, sets one or a plurality of the first electrodes as one driving unit, and inputs electric potentials to the plurality of the first electrodes such that the driving units adjacent to each other in at least one direction have different electric potentials.

According to the above-described electrophoretic display device, in the image removing period, electric fields of a horizontal direction (a substrate face direction) are generated between adjacent driving units by applying a voltage to the first electrodes in a state in which the second electrode is electrically cut off. Here, in the above-described electrophoretic display device, the pitch of the first electrodes is equal to or shorter than the average diameter of the microcapsules. Accordingly, the boundary areas between the first electrodes are disposed within the plane areas of many microcapsules. Therefore, the electrophoretic particles located inside the microcapsule are moved in the horizontal direction in accordance with the electric fields so as to be pulled toward the first electrodes having the electric potential that has polarity opposite to that of the particles. As a result, the electrophoretic particles are scarcely disposed on the second electrode side. Thus, when the electrophoretic display device is viewed from the second substrate side, the gray display (a case where the electrophoretic particles are white particles and black particles) is represented.

Accordingly, there is no display of blinking the white color and the black color during the image removing operation, and thereby it can be prevented to cause a user to have a feeling of discomfort.

In addition, even when the electrophoretic particles remain on the second substrate side in a stage in which image removal is insufficient, the background color is the gray color. Accordingly, an uneven shape of the afterimage is not visually recognized distinctively, and thereby a user does not have a feeling of discomfort.

In addition, the moving direction of the electrophoretic particles in the image moving period is the horizontal direction that is a direction different from the moving direction of the electrophoretic particles for displaying an image. Accordingly, agitation of the electrophoretic particles located inside the microcapsule is sufficient. Therefore, image removal can be performed assuredly, and adherence and fixation of the electrophoretic particles to the second electrode side can be prevented effectively.

In the above-described electrophoretic display device, it is preferable that an average plane area of the microcapsules is equal to or larger than the area of the driving unit and is smaller than four times the area of the driving unit.

When the average plane area of the microcapsule is smaller than the area of the driving unit, the probability that the boundary area of the adjacent driving units is not disposed within the plane area of the microcapsule becomes high. Accordingly, a reaction for moving the electrophoretic particles in the horizontal direction cannot be easily acquired. On the other hand, when the average plane area of the microcapsule is equal to or larger than four times the area of the driving unit, four or more driving units are disposed within the plane area of the microcapsule on the average. Accordingly, uneven distribution of the electrophoretic particles within the microcapsule becomes marked, and thereby the display quality may deteriorate.

In the above-described electrophoretic display device, it is preferable that the average diameter of the microcapsule is equal to or larger than a shortest pitch of the driving units and is smaller than twice the shortest pitch.

The shortest pitch of the driving units indicates a shortest pitch of a plurality of pitches for a case where the plurality of pitches in the arrangement direction of the driving units is different in accordance with the driving units or the shapes of the first electrodes.

When the average diameter of the microcapsule is smaller than the pitch of the driving unit, the probability that the boundary area of the adjacent driving units is not disposed within the plane area of the microcapsule becomes high. Accordingly, a reaction for moving the electrophoretic particles in the horizontal direction cannot be easily acquired. On the other hand, when the average diameter of the microcapsule is larger than twice the pitch of the driving unit, four or more driving units are disposed within the plane area of the microcapsule on the average. Accordingly, uneven distribution of the electrophoretic particles within the microcapsule becomes marked, and thereby the display quality may deteriorate.

In the above-described electrophoretic display device, it is preferable that the image removing period includes: a period in which a first electric potential is input to the first electrodes belonging to some driving units of the plurality of driving units and a second electric potential is input to the first electrodes belonging to the other driving units; and a period in which the first electric potential and the second electric potential are switched so as to be input to the first electrodes belonging to the driving units.

In such a case, the electrophoretic particles located inside the microcapsule can be agitated sufficiently, and thereby an image can be removed more assuredly.

In the above-described electrophoretic display device, in the image removing period, the control unit may be configured to control some first electrodes of the plurality of first electrodes to be in a state electrically cut off.

In such a case, the electrophoretic display device capable of removing a part of the image during the image removing period can be provided.

Alternatively, in the image removing period, the control unit may be configured to input an electric potential on the basis of the image signal corresponding to the currently displayed image to some first electrodes of the plurality of first electrodes.

In such a case, the displayed image is overwritten in a pixel into which the image signal corresponding to the displayed image is written. On the other hand, images are removed in other pixels. As a result, the above-described partial removal operation can be performed.

According to a third aspect of the invention, there is provided an electronic apparatus that includes the above-described electrophoretic display device. According to the above-described configuration, an electronic apparatus including a display unit of a superior image quality that can remove an image without causing a user to feel discomfort can be provided.

BRIEF DESCRIPTION OF THE DRAWINGS

The invention will be described with reference to the accompanying drawings, wherein like numbers reference like elements.

FIGS. 7A to 7C are explanatory diagrams showing the operation of the electrophoretic display device corresponding to FIG. 5.

DESCRIPTION OF EXEMPLARY EMBODIMENTS

Figure 1:
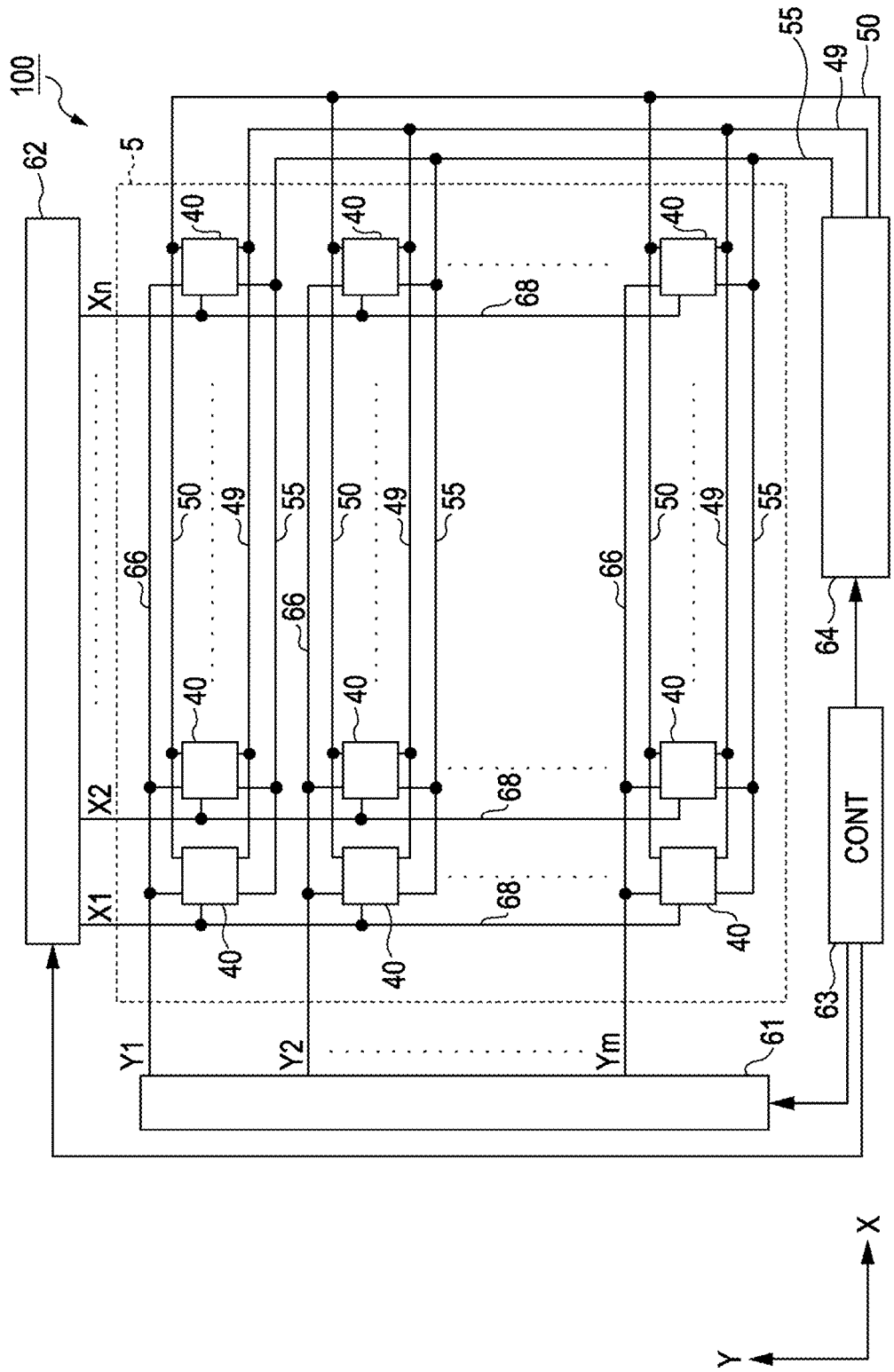
FIG. 1 is a schematic diagram showing the configuration of an electrophoretic display device according to an embodiment of the invention.

Hereinafter, an electrophoretic display device of an active matrix type as an embodiment of the invention will be described with reference to the accompanying drawings.

This embodiment represents only an aspect of the invention, but does not limit the invention and may be arbitrary modified in various forms within the scope of the technical idea of the invention. In the drawings, the scales or the numbers of structures are different from those of actual structures for the purpose of easily understanding the structures.

FIG. 1 is a schematic diagram showing the configuration of an electrophoretic display device 100 according to an embodiment of the invention.

The electrophoretic display device 100 includes a display unit 5 in which a plurality of pixels 40 is arranged in a matrix-shape. In the vicinity of the display unit 5, a scanning line driving circuit 61, a data line driving circuit 62, a controller (control unit) 63, and a common power source modulating circuit 64 are disposed. The scanning line driving circuit 61, the data line driving circuit 62, and the common power source modulating circuit 64 are connected to the controller 63. The controller 63 comprehensively controls the above-described members based on image data and a synchronization signal that are supplied from an upper-level apparatus.

In the display unit 5, a plurality of scanning lines 66 that extends from the scanning line driving circuit 61 and a plurality of data lines 68 that extends from the data line driving circuit 62 are formed. In addition, pixels 40 are disposed in correspondence with intersections of the plurality of scanning lines and the plurality of data lines.

The scanning line driving circuit 61 is connected to the pixels 40 through m scanning lines 66 (Y1, Y2, . . . , Ym). The scanning line driving circuit 61 sequentially selects the scanning lines 66 of the 1st row to the m-th row under control of the controller 63 and supplies a selection signal that defines an ON-timing of a selection transistor 41 (see FIG. 2) disposed in each pixel 40 through the selected scanning line 66.

The data line driving circuit 62 is connected to the pixels 40 through n data lines 68 (X1, X2, . . . , Xn) and supplies an image signal that defines one bit pixel data corresponding to each pixel 40 to the pixel 40 under control of the controller 63.

In addition, in this embodiment, it is assumed that the data line driving circuit supplies a low-level (L) image signal to the pixel 40 in a case where corresponding pixel data is defined as "0" and supplies a high-level (H) image signal to the pixel 40 in a case where corresponding pixel data is defined as "1".

In the display unit 5, a low-electric potential power source line 49, a high-electric potential power source line 50, and a common electrode wiring 55 that extend from the common power source modulating circuit 64 are disposed, and each wiring is connected to the pixels 40. The common power source modulating circuit 64 generates various signals to be supplied to the above-described wirings and electrically connects or disconnects (high impedance state) the wirings, under control of the controller 63.

Figure 2:
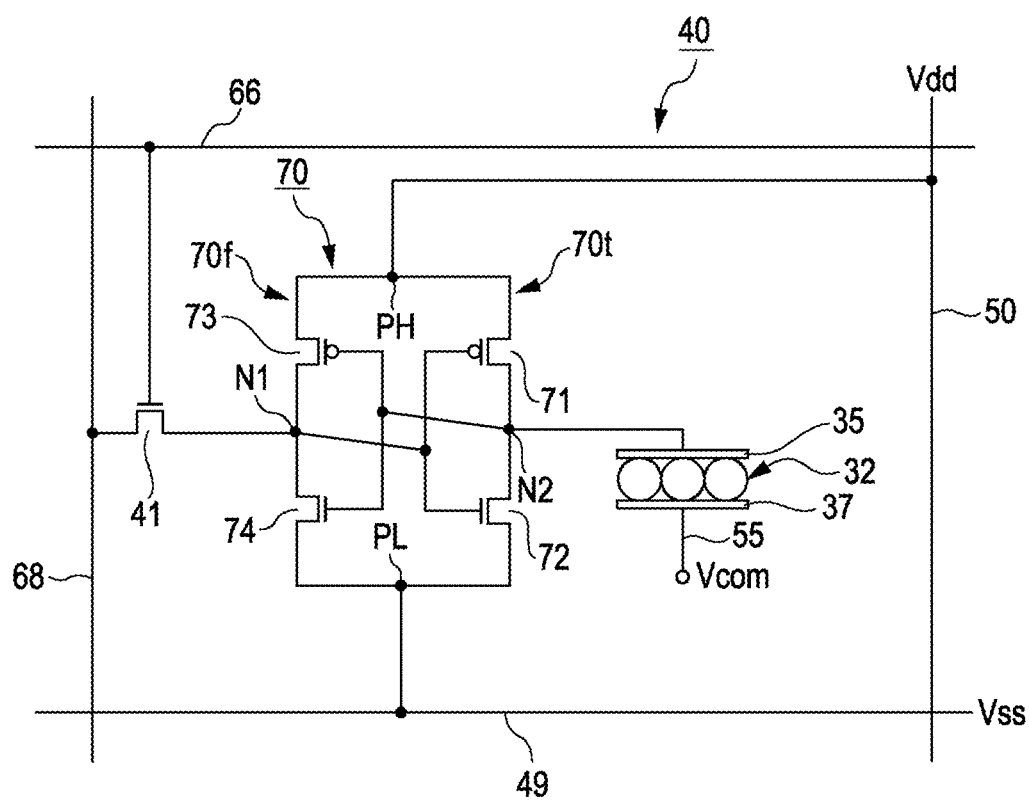
FIG. 2 is a diagram showing a pixel circuit according to an embodiment of the invention.

FIG. 2 is a circuit configuration diagram of the pixels 40 that are disposed on the display unit 5.

In the pixel 40, a selection transistor 41 (pixel switching element), a latch circuit 70, an electrophoretic element 32, a pixel electrode 35 as the first electrode, and a common electrode 37 as the second electrode are disposed. The scanning line 66, the data line 68, the low-electric potential power source line 49, and the high-electric potential power source line 50 are disposed so as to surround the above-described elements. The configuration of the pixel 40 is an SRAM (Static Random Access Memory) type in which an image signal is maintained as an electric potential by the latch circuit 70.

The selection transistor 41 is an N-MOS (Negative Metal Oxide Semiconductor) transistor. The gate terminal of the selection transistor 41 is connected to the scanning line 66, the source terminal of the selection transistor 41 is connected to the data line 68, and the drain terminal of the selection transistor 41 is connected to a data input terminal N1 of the latch circuit 70. A data output terminal N2 of the latch circuit 70 is connected to the pixel electrode 35. In addition, between the pixel electrode 35 and the common electrode 37, the electrophoretic element 32 is pinched.

The latch circuit 70 includes a transfer inverter 70t and a feedback inverter 70f. Both the transfer inverter 70t and the feedback inverter 70f are C-MOS inverters. The transfer inverter 70t and the feedback inverter 70f form a loop structure in which, to each input terminal of one between the transfer inverter and the feedback inverter, an output terminal of the other is connected. In addition, to each inverter, a power source voltage is supplied from the high-electric potential power source line 50 that is connected through a high-electric potential power source terminal PH and the low-electric potential power source line 49 that is connected through a low-electric potential power source terminal PL.

The transfer inverter 70t includes a P-MOS (Positive Metal Oxide Semiconductor) transistor 71 and an N-MOS transistor 72. The source terminal of the P-MOS transistor 71 is connected to the high-electric potential power source terminal PH, the drain terminal of the P-MOS transistor 71 is connected to the data output terminal N2. The source terminal of the N-MOS transistor 72 is connected to the low-electric potential power source terminal PL, and the drain terminal of the N-MOS transistor 72 is connected to the data output terminal N2. The gate terminals (the input terminal of the transfer inverter 70t) of the P-MOS transistor 71 and the N-MOS transistor 72 are connected to the data input terminal N1 (the output terminal of the feedback inverter 70f).

The feedback inverter 70f includes a P-MOS transistor 73 and an N-MOS transistor 74. The source terminal of the P-MOS transistor 73 is connected to the high-electric potential power source terminal PH, and the drain terminal of the P-MOS transistor 73 is connected to the data input terminal N1. The source terminal of the N-MOS transistor 74 is connected to the low-electric potential power source terminal PL, and the drain terminal of the N-MOS transistor 74 is connected to the data input terminal N1. The gate terminals (the input terminal of the feedback inverter 70f) of the P-MOS transistor 73 and the N-MOS transistor 74 are connected to the data output terminal N2 (the output terminal of the transfer inverter 70t).

When an image signal of a high-level (H) (a pixel data of "1") is stored in the latch circuit 70, a low-level (L) signal is output from the data output terminal N2 of the latch circuit 70.

On the other hand, when an image signal of a low-level (L) (pixel data of "0") is stored in the latch circuit 70, a high-level (H) signal is output from the data output terminal N2.

Then, the electric potential that is output from the data output terminal N2 is input to the pixel electrode 35. On the other hand, the common electrode electric potential Vcom is supplied to the common electrode 37 through the common electrode wiring 55 (FIG. 1). The electrophoretic element 32 displays an image in accordance with an electric field that is generated based on an electric potential difference between the pixel electrode 35 and the common electrode 37.

Figure 3A:
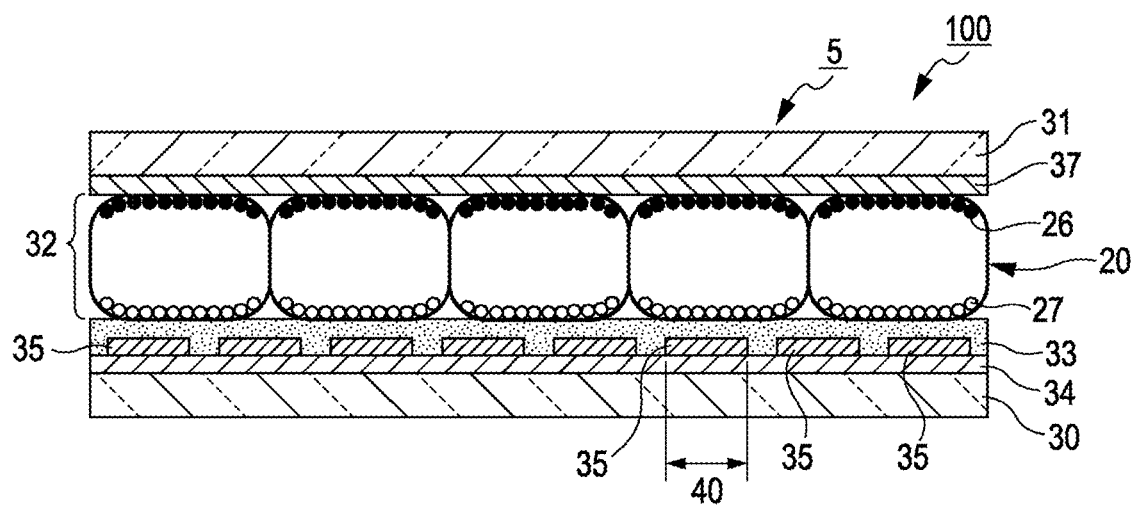
FIGS. 3A and 3B are a partial cross-section view of an electrophoretic display device according to an embodiment of the invention and a plan view of major parts of the electrophoretic display device.

FIG. 3A is a partial cross-section view of the display unit 5 of the electrophoretic display device 100. The electrophoretic display device 100 has a configuration in which electrophoretic elements 32 that are formed by arranging a plurality of microcapsules 20 is pinched between a component substrate (first substrate) 30 and an opposing substrate (second substrate) 31.

In the display unit 5, on a side of the component substrate 30 that is located on the electrophoretic element 32 side, a circuit layer 34, in which the scanning line 66, the data line 68, the selection transistor 41, the latch circuit 70, and the like shown in FIGS. 1 and 2 are formed, is disposed and a plurality of the pixel electrodes 35 is arranged and formed on the circuit layer 34.

The component substrate 30 is a substrate that is formed of glass, plastic, or the like. The component substrate 30 is disposed on a side opposite to the image display surface, and accordingly, the component substrate 30 may not be transparent. The pixel electrode 35 is an electrode that applies a voltage to the electrophoretic element 32 formed by laminating nickel coating and gold coating on thin CU (copper) in the described order or formed of Al (aluminum), ITO (indium tin oxide), or the like.

On the other hand, on a side of the opposing substrate 31 that is located on the electrophoretic element 32 side, the common electrode 37 of a flat shape opposing a plurality of the pixel electrodes 35 is formed. On the common electrode 37, the electrophoretic elements 32 are disposed.

The opposing substrate 31 is a substrate that is formed of glass, plastic, or the like. The opposing substrate 31 is disposed on the image display side, and accordingly, the opposing substrate 31 is formed as a transparent substrate. The common electrode 37 is an electrode that applies a voltage to the electrophoretic elements 32 together with the pixel electrode 35. The common electrode 37 is a transparent electrode that is formed of MgAg (Magnesium Silver), ITO (Indium Tin Oxide), IZO (Indium Zinc Oxide), or the like.

By bonding the electrophoretic element 32 and the pixel electrode 35 through an adhesive agent layer 33, the component substrate 30 and the opposing substrate 31 are bonded together.

In addition, the electrophoretic element 32 is formed on the opposing substrate 31 side in advance and is generally treated as an electrophoretic sheet including the adhesive agent layer 33. In a manufacturing process, the electrophoretic sheet is handled in a state that a detachable protection sheet is attached to the surface of the adhesive agent layer 33. In addition, by attaching the electrophoretic sheet from which the detachable sheet is taken off to the component substrate 30 (the pixel electrode 35 and various circuits are formed) that is manufactured separately, the display unit 5 is formed. Accordingly, the adhesive agent layer 33 exists only on the pixel electrode 35 side.

Figure 3B:
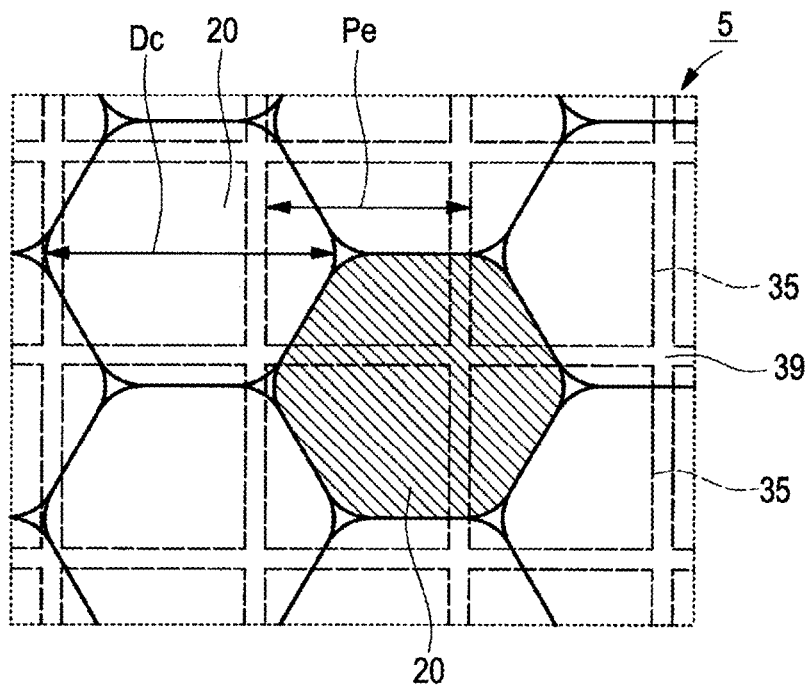

FIG. 3B is a plan view of the microcapsules 20 and the pixel electrodes 35. As shown in FIGS. 3A and 3B, in the electrophoretic display device 100 according to this embodiment, a plane area of the microcapsule 20 that is densely disposed is larger than a plane area of the pixel electrode 35. In addition, within the plane area of each microcapsule 20, a boundary area 39 having a lattice shape among the pixel electrodes 35 is included.

Described in more details, an average diameter Dc of the microcapsule 20 in the plan view is configured to be larger than the pitch Pe of the pixel electrodes 35. As shown in FIG. 3B, in a case where square-shaped pixel electrodes 35 are arranged in a matrix shape equally spaced, all the pitches Pe of the pixel electrodes 35 for the horizontal direction and the vertical direction in the figure are the same. However, in a case where the pitches of the pixel electrodes 35 for a plurality of arrangement directions of the pixel electrodes 35 are different, a pitch on a smaller side (the shortest pitch) is the above-described pitch Pe.

The average diameter Dc of the microcapsule 20 is a value that can be acquired by measuring the widths in the direction of the pitch Pe determined based on the shapes and the arrangement form of the pixel electrodes 35 for a plurality of the microcapsules 20 and averaging the widths. For example, the average diameter Dc can be calculated as an average of diameters of a plurality of the microcapsules 20 by actually measuring the diameters (widths) of the plurality of the microcapsules 20 within the field of view of a 100 μm×100 μm area.

In FIG. 3B, since all the microcapsules 20 have a same diameter, the average diameter Dc is denoted as a width of the microcapsule 20 in the horizontal direction in the figure. However, in the actual electrophoretic display device 100, the microcapsule 20 forms a polygonal shape such as a rectangular shape. Accordingly, the average diameter is not necessarily the same as the diameter of each microcapsule 20.

Alternatively, as a simpler calculation method, the average diameter Dc may be defined as an average value of diameters of the sphere-shaped microcapsules 20 that are not installed to the electrophoretic display device 100. When a deformation amount of the microcapsule 20 between before and after being installed to the electrophoretic display device 100 is small, an average diameter Dc of a valid value can be estimated in a simple manner.

According to an embodiment of the invention, the dimensional relationship between the microcapsule 20 and the pixel electrode 35 may be defined as plane areas thereof. In other words, the plane area of the microcapsule 20 may be configured to be equal to or larger than the plane area of the pixel electrode 35. Even in such a case, the boundary area of the pixel electrodes 35 is included within the most of the plane area of the microcapsule 20, and accordingly, the advantages according to a driving method to be described later can be acquired. In particular, when the pixel electrode 35 has a shape in which the arrangement pitch forming a square shape or the like and the plane area is in one-to-one correspondence, it is simpler to define the dimensional relationship as the relationship of the plane areas.

Figure 4:
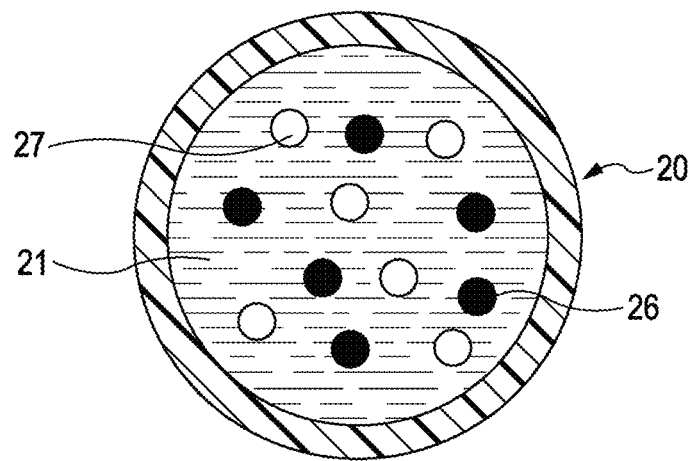
FIG. 4 is a cross-section view of a microcapsule according to an embodiment of the invention.

FIG. 4 is a schematic cross-section view of the microcapsule 20. The microcapsule 20, for example, has a particle diameter of about 50 μm and is a sphere-shaped body in which a dispersion medium 21, a plurality of white particles (electrophoretic particles) 27, and a plurality of black particles (electrophoretic particles) 26 are enclosed. The microcapsule 20, as shown in FIG. 3A, is pinched by the common electrode 37 and the pixel electrode 35, and one or a plurality of microcapsules 20 are disposed within one pixel 40.

The outer shell part (wall film) of the microcapsule 20 is formed of a transparent high molecular resin such as acryl resin including polymethylmethacrylate, polyethylmethacrylate, or the like, urea resin, gum Arabic, or the like.

The dispersion medium 21 is a liquid that disperses the white particles 27 and the black particles 26 into the microcapsule 20. As the dispersion medium 21, water; an alcohol-based solvent such as methanol, ethanol, isopropanol, butanol, octanol, or methyl cellosolve; esters such as ethyl acetate or butyl acetate; ketones, such as acetone, methylethylketone, or methylisobutylketone; aliphatic hydrocarbon such as pentane, hexane, or octane; alicyclic hydrocarbon such as cyclohexane or methylcyclohexane; aromatic hydrocarbon such as benzene, toluene, or benzene having a long-chain alkyl group including xylene, hexylbenzene, hebuthylbenzene, octylbenzene, nonylbenzene, decylbenzene, undecylbenzene, dodecylbenzene, tridecylebenzene, or tetradecylbenzene; halogenated hydrocarbon such as methylene chloride, chloroform, carbon tetrachloride, or 1,2-dichloroethane; carboxylate; or other kinds of oils can be used. The above-described materials may be used in the form of a single material or a mixture. Further, surfactant or the like may be added to the above-described material.

The white particles 27 are particles (polymers or colloids) made of white pigment such as titanium dioxide, zinc oxide, or antimony trioxide and, for example, are used in a negatively charged state. The black particles 26 are particles (polymer particles or colloids) made of black pigment such as aniline black or carbon black and, for example, are used in a positively charged state.

In addition, a charge control agent containing particles of an electrolyte, a surfactant, metal soap, a resin, rubber, oil, varnish, compound, or the like; a dispersant such as a titanium-based coupling agent, an aluminum-based coupling agent, and a silane-based coupling agent; a lubricant; a stabilizing agent; or the like may be added to the above-described pigment, as needed.

Instead of the black particles 26 and the white particles 27, for example, pigment of a red color, a green color, a blue color, or the like may be used. Under such a configuration, the red color, the green color, the blue color, or the like may be displayed in the display unit 5.

Driving Method

Next, a method of driving the electrophoretic display device 100 according to this embodiment will be described with reference to FIGS. 5 to 7C.

Figure 5:
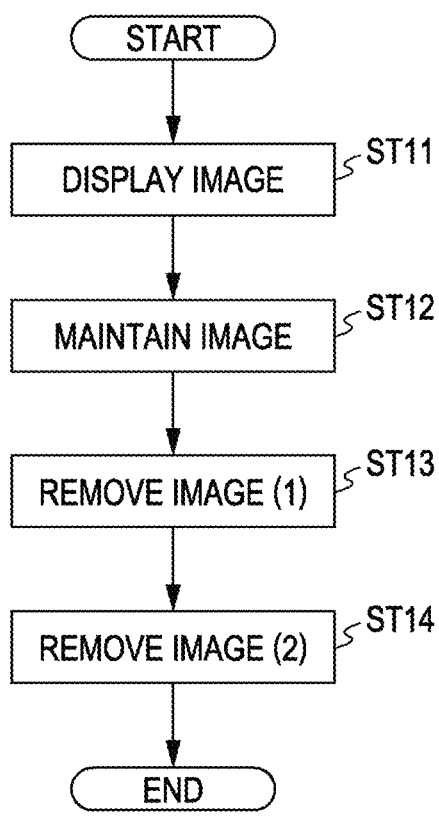
FIG. 5 is a flowchart showing a method of driving an electrophoretic display device according to an embodiment of the invention.

FIG. 5 is a flowchart showing the method of driving the electrophoretic display device 100.

The driving method according to this embodiment includes an image displaying step ST11 (image displaying period) in which an image is displayed in the display unit 5, an image maintaining step ST12 (image maintaining period) in which the displayed image is maintained, and a first image removing step ST13 (image removing period) and a second image removing step ST14 (image removing period) in which the image in the display unit 5 is removed.

Figure 6:
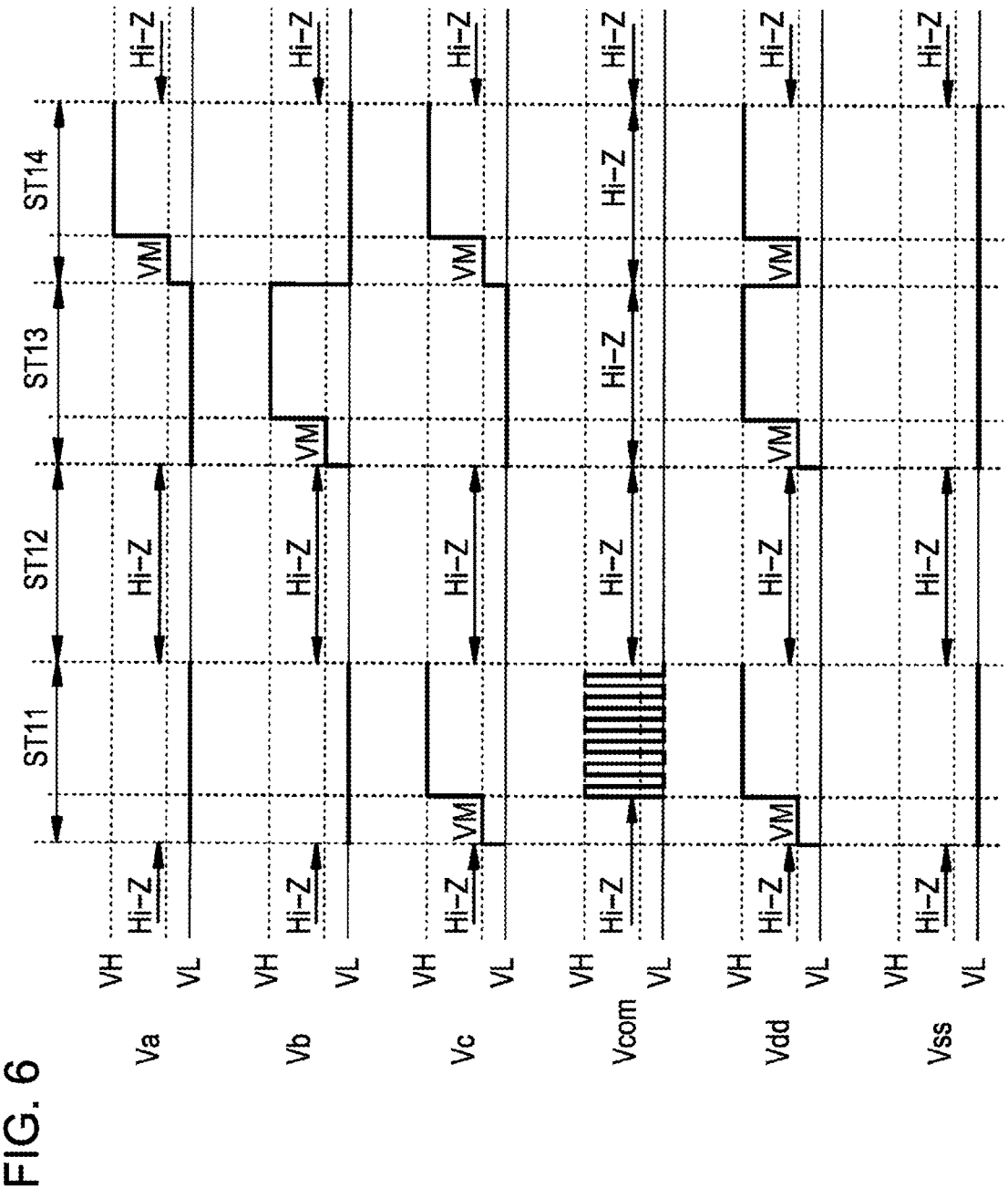
FIG. 6 is a timing chart corresponding to FIG. 5.

FIG. 6 is a timing chart corresponding to FIG. 5. FIGS. 7A to 7C are explanatory diagrams showing the operation of the display unit 5 corresponding to the steps shown in FIG. 5.

FIGS. 7A, 7B, and 7C correspond to the image displaying step ST11, the first image removing step ST13, and the second image removing step ST14. FIGS. 7A to 7C show eight pixels 40A to 40H among pixels 40 of the display unit 5. The pixel electrodes 35A to 35H are formed in correspondence with the pixels 40A to 40H. In addition, on the pixel electrodes 35A to 35H, five microcapsules 20 are arranged. The common electrode 37 is common to the pixels 40A to 40H.

In addition, in FIG. 6, the electric potentials Va, Vb, and Vc of the pixel electrodes 35A to 35C that belong to the pixels 40A to 40C, the electric potential Vcom of the common electrode 37, the electric potential Vdd of the high-electric potential power source line 50, and the electric potential Vss of the low-electric potential power source line 49 are shown.

In FIG. 6, a high-level electric potential VH is a high electric potential (for example, about 10 to 15 V) that is used for driving the electrophoretic element 32. An intermediate high-level electric potential VM is a high electric potential (for example, 5 V) that is used for inputting an image signal to the latch circuit 70. In addition, a low-level electric potential VL is a low electric potential (for example, 0 V: the ground electric potential) that is used for inputting the image signal and driving the electrophoretic element 32.

First, in the image displaying step ST11, an image on the basis of image data that is input from an upper level apparatus is displayed in the display unit 5. According to this embodiment, an image in which, among the pixels 40A to 40H shown in FIG. 7A, the pixels 40A, 40B, 40E, and 40F represent white display, and the pixels 40C, 40D, 40G, and 40H represent black display is displayed in the display unit 5.

In particular, when the process proceeds to the image displaying step ST11, first, an image signal is written into the latch circuit 70 through the selection transistor 41 of a pixel 40 by the scanning line driving circuit 61 and the data line driving circuit 62 that are shown in FIG. 1. In other words, a selection transistor 41 of a predetermined pixel 40 is turned on in accordance with a selection signal that is output from the scanning line driving circuit 61, and an image signal that is supplied from the data line driving circuit 62 in synchronization with the selection signal is input to the data input terminal N1 of the latch circuit 70. Accordingly, the latch circuit 70 is in a state in which an image signal of a high level (intermediate high-level electric potential VM) or a low level (low-level electric potential VL) is maintained as the electric potential thereof.

In addition, in the operation for inputting the image signal to the latch circuit 70, the electric potential Vdd of the high-electric potential power source line 50 becomes the intermediate high-level electric potential VM that is matched to the high-level of the image signal, and the electric potential Vss of the low electric potential power source line 49 becomes the low-level electric potential VL.

Accordingly, electric potentials corresponding to the image signal are output from the data output terminals N2 of the latch circuits 70 of the pixels 40A to 40H and are input to the pixel electrodes 35A to 35H. As shown in FIGS. 6 and 7A, the electric potentials Va and Vb of the pixel electrodes 35A and 35B become the low-level electric potential VL, and the electric potential Vc of the pixel electrode 35C becomes the intermediate high level electric potential VM.

When input of the image signal to the latch circuit 70 of the pixel 40 is completed, the electric potential Vdd of the high electric potential power source line 50 is pulled up to the high-level electric potential VH for acquiring a sufficient voltage for driving the electrophoretic element 32. Accordingly, the high-level electric potential that is output from the data output terminal N2 of the latch circuit 70 increases. Then, in accompaniment with the increase in the high-level electric potential, the electric potential Vc of the pixel electrode 35C increases from the intermediate high-level electric potential VM to the high-level electric potential VH. In addition, the electric potentials of the pixel electrodes 35D, 35G, and 35H increase in the same manner.

Then, a pulse having the shape of a square wave in which the high-level electric potential VH and the low-level electric potential VL are repeated at a predetermined period is input to the common electrode 37.

Accordingly, in a period in which the electric potential Vcom of the common electrode 37 is the high-level electric potential VH, the electrophoretic elements 32 are driven in accordance with electric fields that are generated between the pixel electrodes 35A, 35B, 35E, and 35F having the low-level electric potential VL and the common electrode 37. Therefore, the pixels 40A, 40B, 40E, and 40F represent black display. On the other hand, in a period in which the electric potential Vcom of the common electrode 37 is the low-level electric potential VL, the electrophoretic elements 32 are driven in accordance with electric fields that are generated between the pixel electrodes 35C, 35D, 35G, and 35H having the high-level electric potential VH and the common electrode 37. Therefore, the pixels 40C, 40D, 40G, and 40H represent white display.

When an image is displayed in the display unit 5 as described above, the process proceeds to the image maintaining step ST12. In the image maintaining step ST12, as shown in FIG. 6, the high-electric potential power source line 50, the low-electric potential power source line 49, and the common electrode 37 are electrically cut off from the common power source modulating circuit 64 so as to be in the high impedance state. Accordingly, the pixel electrodes 35A to 35H of the pixels 40A to 40H are also in the high impedance state, and thereby the display image can be maintained without consuming power.

Next, when an operation for updating the image displayed in the display unit 5 of the electrophoretic display device 100 is selected, the process proceeds to the first image removing step ST13.

In the first image removing step ST13, first, an image signal for image removal is input to the pixel 40 by the same operation as that in the image displaying step ST11. The image data for image removal is data in which pixel data "0" and pixel data "1" are alternately arranged. A high-level image signal is input to one pixel 40 between two adjacent pixels 40 belonging to a same scanning line 66, and a low-level image signal is input to the other pixel 40.

When the image signal for image removal is input to the latch circuit 70 of the pixel 40, the electric potential of the pixel electrode 35 is changed based on the signal that is output from the data output terminal N2 of the latch circuit 70. In the pixels 40A to 40H shown in FIG. 7B, the pixel electrodes 35A, 35C, 35E, and 35G of the pixels 40A, 40C, 40E, and 40G are changed to be in the low level (low-level electric potential VL). On the other hand, the pixel electrodes 35B, 35D, 35F, and 35H of the pixels 40B, 40D, 40F, and 40H are changed to be in the high level (intermediate high level electric potential VM).

When inputting the image signal for image removal is completed, the electric potential Vdd of the high-electric potential power source line 50 is pulled up to the high-level electric potential VH from the intermediate high-level electric potential VM. On the other hand, the common electrode 37 is maintained to be in the high impedance state.

Accordingly, electric fields of a horizontal direction (a substrate face direction) are formed between adjacent pixel electrodes 35. In particular, electric fields from the pixel electrode 35B having the high-level electric potential VH toward adjacent pixel electrodes 35A and 35C are formed. At this moment, the electric potential Vcom of the common electrode 37 that is in the high impedance state is determined based on the electric potential distribution of the pixel electrodes 35. In this step, the electric potential Vcom of the common electrode 37 has the electric potential near a middle electric potential (VH+VL)/2 of the high-level electric potential VH and the low-level electric potential VL. Accordingly, although electric fields according to the inter-electrode electric potential differences between the pixel electrode 35 and the common electrode 37 are formed, the electric potential difference is about half the electric potential difference formed in the horizontal direction. Therefore, the electric field of the horizontal direction is mainly applied to the electrophoretic element 32.

By the reaction of the above-described electric fields, as shown in FIG. 7B, black particles 26 are collected to the pixel electrodes 35A, 35C, 35E, and 35G having the low-level electric potential VL. In addition, white particles 27 are collected to the pixel electrodes 35B, 35D, 35F, and 35H having the high-level electric potential VH.

As described above, in the first image removing step ST13, a state in which most of the electrophoretic particles are collected to the pixel electrode 35 side is formed, and thereby the color displayed in the display unit 5 becomes the gray color.

When the first image removing step ST13 is completed, the process proceeds to the second image removing step ST14.

The detailed operation in the second image removing step ST14 is the same as that in the first image removing step ST13, and only a used image signal for image removal is different from that in the first image removing step ST13. In particular, in the second image removing step ST14, image data that is acquired by inverting the gray scale of the image data for image removal that is used in the first image removing step ST13 is used.

Accordingly, when the second image removing step ST14 is performed, as shown in FIG. 7C, the high-level electric potential VH is input to the pixel electrodes 35A, 35C, 35E, and 35G, and the low-level electric potential VL is input to the pixel electrodes 35B, 35D, 35F, and 35H. Then, the direction of the electric fields that are generated between the adjacent pixel electrodes 35 is inverted. Accordingly, the white particles 27 move onto the pixel electrodes 35A, 35C, 35E, and 35G, and the black particles 26 move onto the pixel electrodes 35B, 35D, 35F, and 35H. Therefore, the electrophoretic particles located inside the microcapsule 20 are agitated further, and accordingly, the image displayed in the display unit 5 is removed assuredly.

After the second image removing step ST14 is completed, an operation for displaying a new image in the display unit 5 is performed by a same operation as that in the image displaying step ST11. In the first image removing step ST13 and the second image removing step ST14 described above, for example, the high-level electric potential VH corresponds to the first electric potential, and the low-level electric potential VL corresponds to the second electric potential.

As described above in detail, according to the driving method of this embodiment, in the first and second image removing steps ST13 and ST14, different electric potentials are input to the adjacent pixel electrodes 35 with the common electrode 37 in the high impedance state. Accordingly, the electrophoretic particles located inside the microcapsule 20 are collected on the pixel electrode 35 side in accordance with the electric field of the horizontal direction (substrate face direction) which is formed between the pixel electrodes 35. Therefore, in the image removing steps, the display unit 5 represents the gray display, and display of the white and black colors does not blink. In addition, even in a stage in which image removal is insufficient, the background color is the gray color. Accordingly, an image is not visually distinguished and recognized regardless of the color type of the afterimage.

Accordingly, according to the driving method of this embodiment, an image can be removed without causing a user to have a feeling of discomfort.

In addition, according to the driving method of this embodiment, in the first and second image removing steps ST13 and ST14, the electrophoretic particles are driven in accordance with the electric field of the horizontal direction. In other words, the electrophoretic particles are moved so as to be removed in a direction that is different from a direction (vertical direction: the direction of thickness of the electrophoretic element 32) in which the electrophoretic particles move in the image displaying step ST11. Accordingly, agitation of the electrophoretic particles can be performed well, compared to a general image removing operation in which the black display and the white display are represented on the whole surface. Therefore, image removal can be performed assuredly.

In addition, in the general image removing operation, the electrophoretic particles are driven in the vertical direction. Accordingly, there is a problem that the electrophoretic particles may adhere to the top face (a face located on the common electrode 37 side) of the microcapsule 20. On the contrary, according to the driving method of this embodiment, when the image removing operation is performed, most of the electrophoretic particles are collected on the pixel electrode 35 side. Accordingly, the electrophoretic particles cannot adhere to the top face of the microcapsule 20 easily. In addition, a reaction for taking the adhering electrophoretic particles apart is exhibited. As a result, the display quality can be maintained well over a long period.

In this embodiment, the first image removing step ST13 and the second image removing step ST14 are configured to be performed. However, the second image removing step ST14 may be provided as needed. Thus, in the driving method, only the first image removing step ST13 may be configured to be performed.

Alternatively, it may be configured that additional one or more image removing steps are provided after the second image removing step ST14 is performed, so that image removal is performed more assuredly. When the image removing step is added, as is the same as the first and second image removing steps ST13 and ST14, it is preferable that image data, used for image removal, of which the gray scale is inverted, is used between consecutive image removing steps.

In addition, according to this embodiment, the pixels 40A to 40H that are arranged in one direction are represented and described in FIGS. 7A to 7C. However, the direction of arrangement of the pixels 40A to 40H may be configured to be the extending direction of the scanning line 66, the extending direction of the data line 68, or a different direction. In other words, in the first and second image removing steps ST13 and ST14, the image signal is input such that pixel electrodes 35, located adjacently in at least one arrangement direction, of the plurality of pixels 40 arranged in the display unit 5 have different electric potentials.

In addition, the image signal may be configured to be input such that pixel electrodes 35 that are adjacent in two arrangement directions (in the case of the matrix shape, the row direction and the column direction) have different electric potentials. In such a case, in the first and second image removing steps ST13 and ST14, more uniform gray display is represented in the display unit 5. Accordingly, the user's feeling of discomfort can be reduced further. In addition, agitation of the electrophoretic particles inside the microcapsule 20 can be performed more efficiently, and thereby removal of display can be performed more assuredly.

The electrophoretic display device 100 and the driving method thereof according to this embodiment can be implemented by only defining the dimensional relationship of the pixel electrode 35 and the microcapsule 20. Accordingly, image removal and afterimage removal can be performed efficiently by scarcely changing the shape or the disposition pattern of the pixel electrode 35 of the display unit 5.

Modified Example 1

Figure 8:
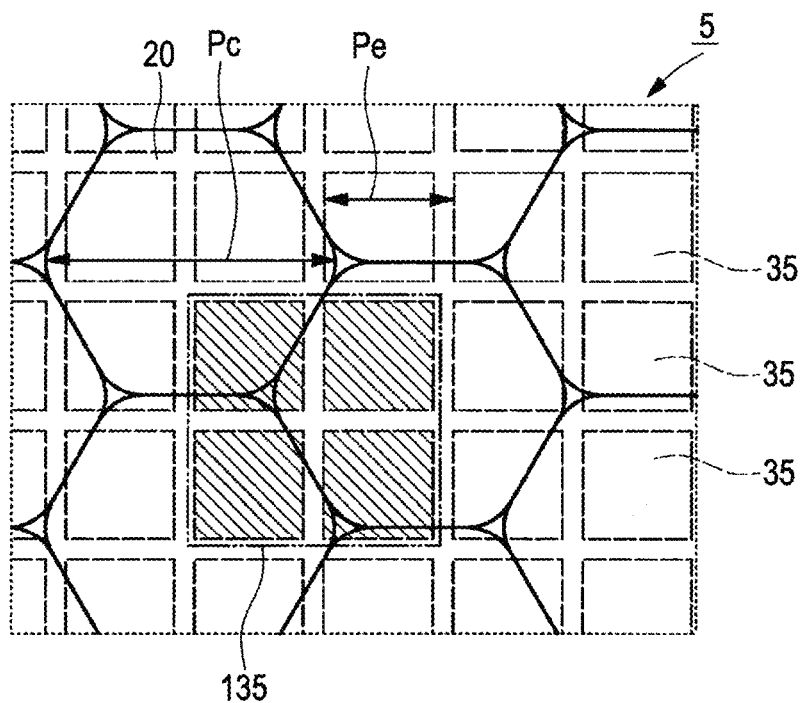
FIG. 8 is a plan view of major parts of an electrophoretic display device according to Modified Example 1.

In the above-described embodiment, in the first and second image removing steps ST13 and ST14, different electric potentials are configured to be input to the pixel electrodes 35 that are disposed adjacently. However, in a driving method according to an embodiment of the invention, the form of inputting the electric potentials may be changed. For example, as shown in FIG. 8, when the plane area of the pixel electrode 35 is smaller than that of the microcapsule 20, it is preferable that the driving form is changed. FIG. 8 is a diagram corresponding to FIG. 3B that is referred to in the description of the above-described embodiment.

In the configuration shown in FIG. 8, the pitch Pe of the pixel electrode 35 is about a half of the pitch Pe of the pixel electrode 35 represented in the configuration shown in FIG. 3B, and the plane area of the microcapsule 20 is formed as an area corresponding to almost four pixel electrodes 35. Under such a configuration, a plurality of the pixel electrodes 35 is disposed within the plane area of the microcapsule 20. Accordingly, uneven distribution of the electrophoretic particles may easily occur inside the microcapsule 20.

Accordingly, for example, it is preferable that four pixel electrodes 35 shown to be shaded in the figure is set as one driving unit and then, the first and second image removing steps ST13 and ST14 are performed. In other words, a driving method in which the electric potentials of the pixel electrode 35 of the driving unit 135 that is constituted by four pixel electrodes 35 disposed in a tetragonal shape are set to be in the high-level electric potential VH, and the electric potentials of four pixel electrodes 35 belonging to another driving unit that is adjacently located to the above-described driving unit 135 are set to be in the low-level electric potential VL may be used.

By using the above-described driving method, the form of movement of the electrophoretic particles inside the microcapsule 20 is the same as that of the electrophoretic display device 100 according to the above-described embodiment. Accordingly, it is possible that uneven distribution of the electrophoretic particles is prevented effectively, and image removal and afterimage removal can be performed efficiently.

The uneven distribution of the electrophoretic particles tends to be prominent particularly for a case where the plane area of the microcapsule 20 is equal to or larger than four driving units. Accordingly, in the method of driving the electrophoretic display device according to an embodiment of the invention, it is preferable that the driving unit is set to have a plane area equal to or larger than ¼ of the plane area of the microcapsule 20. When the dimensional relationship is defined by using the average diameter Dc of the microcapsules 20, it is preferable that the driving unit is set to have a pitch equal to or larger than ½ of the average diameter Dc. The pitch of the driving unit described here is a shortest pitch among pitches for the direction of arrangement of the plurality of driving units.

Modified Example 2

In addition, in the above-described embodiment, a case where the entire image in the display unit 5 is removed in the first and second image removing steps ST13 and ST14 has been described. However, a part of the displayed image may be configured to be removed in the first and second image removing steps ST13 and ST14.

Figure 9A:
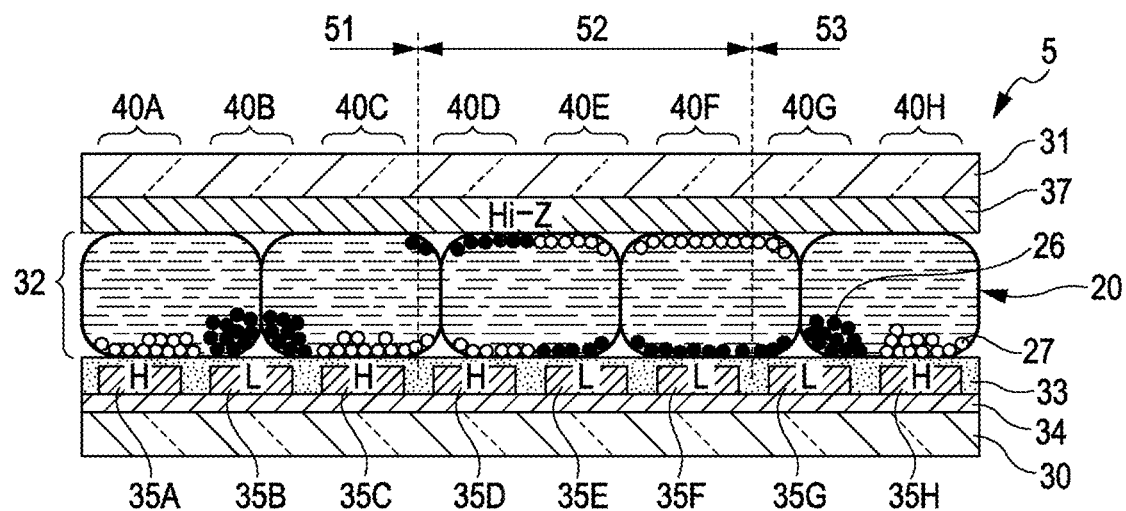
FIG. 9 is a cross-section view of an electrophoretic display device according to Modified Example 2.

FIG. 9A is a cross-section view of the display unit 5 showing a state in which partial removal is performed in the electrophoretic display device 100.

When a part of the displayed image is removed in the electrophoretic display device 100, an image signal corresponding to an image currently displayed is re-input to the pixels 40D to 40F belonging to an area 52 for maintaining the image, and, as in the above-described embodiment, the high-level electric potential VH and the low-level electric potential VL are alternately input to the arranged pixel electrodes 35 of the pixels 40A to 40C, 40G, and 40H belonging to the areas 51 and 53 in which the images are removed. The common electrode 37 is maintained to be in the high-impedance state.

Accordingly, the electrophoretic elements of the areas 51 and 53 are driven in accordance with the electric fields of the horizontal direction generated between adjacent pixel electrodes 35. Therefore, as shown in the figure, the black particles 26 are collected on the pixel electrodes 35A, 35C, and 35H, and the white particles 27 are collected on the pixel electrodes 35B and 35G. As a result, the gray display is represented in the areas 51 and 53, and the image therein is removed.

On the other hand, in the area 52, the image signal corresponding to the image currently displayed is input to the pixel 40, and accordingly, the electric potential states of the pixel electrodes 35D to 35F are the same as those in the image displaying step ST11. Here, the common electrode 37 is in the high-impedance state. Accordingly, between the pixel electrode 35 and the common electrode 37, an electric field that is equivalent to that in the image displaying step ST11 is not formed.

However, the electric potential of the common electrode 37 changes based on the distribution of the electric potentials of the pixel electrodes 35 so as to be an electric potential near the average electric potential of the pixel electrodes 35. In the case shown in FIG. 9A, the number of pixel electrodes 35 having the high-level electric potential VH and the number of pixel electrodes 35 having the low-level electric potential VL are the same. Accordingly, the common electrode 37 has an electric potential near (VH+VL)/2.

Accordingly, in the area 52, between each pixel electrode 35 and the common electrode 37, an electric field is formed in the direction of the thickness of the electrophoretic element 32. In addition, in the pixel 40 of the area 52, the electrophoretic element 32 is driven in accordance with the input image signal, and thereby a display image that is the same as the original image is overwritten. When a time elapses after the image displaying step ST11 and the contrast decreases, an advantage that the contrast is recovered can be acquired by performing the above-described operation.

In the case of the above-described driving method, even within the area 52, an electric field of the horizontal direction is formed in a portion of an image boundary in which pixels 40 having different gray scales are disposed adjacently, and thereby the electrophoretic particles are moved in the horizontal direction. For example, within the area 52 shown in FIG. 9A, an electric field of a horizontal direction is formed between the pixel 40D and the pixel 40E, and a part of the boundary of the white and the black may represent the gray display. However, even in such a case, the contour of the entire image is maintained, and accordingly, there is little influence on the display quality.

Figure 9B:
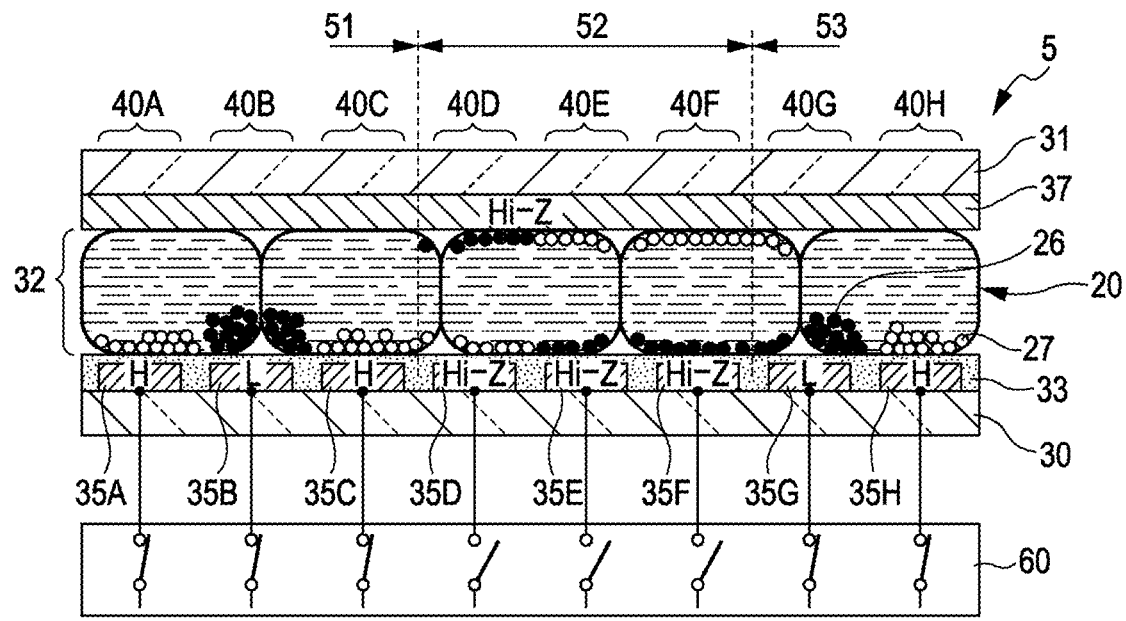

In addition, when the electrophoretic display device 100 is configured as a segment type in which individual pixel electrodes 35 are driven directly, an area in which an image is removed and an area in which an image is maintained can be controlled at higher accuracy. FIG. 9B is an explanatory diagram showing a partial removal operation for a case where the segment type is employed.

As shown in FIG. 9B, when the segment type is employed, a pixel electrode driving circuit 60 that is directly connected to the pixel electrodes 35 is disposed. In the pixel electrode driving circuit 60, switching elements are disposed in correspondence with the pixel electrodes 35, so that electrical connection and disconnection of a signal supplying wiring for the pixel electrodes 35 can be individually controlled.

In the partial removal operation, a same electric potential as that of the case shown in FIG. 9A is input to the pixel electrodes 35A to 35C, 35G, and 35H of the areas 51 and 53 for image removal. On the other hand, the pixel electrodes 35D to 35F of the area 52 for maintaining an image are in the high-impedance state. In addition, the common electrode 37 is also in the high-impedance state.

Accordingly, in the areas 51 and 53, the electrophoretic elements are driven in accordance with the electric fields of the horizontal direction that are generated between adjacent pixel electrodes 35. In addition, as shown in the figure, the black particles 26 are collected on the pixel electrodes 35A, 35C, and 35H, and the white particles 27 are collected on the pixel electrodes 35B and 35G. Accordingly, the gray display is represented in the areas 51 and 53, and thereby the images therein are removed.

On the other hand, in the area 52, all the pixel electrodes 35D to 35F and the common electrode 37 are in the high-impedance state, and accordingly, a voltage is not applied to the electrophoretic elements 32. Therefore, display in the area 52 is maintained.

In addition, the pixel electrode 35D is in the high-impedance state, also in the boundary of the area 51 and the area 52, and accordingly, an electric field of the horizontal direction is not formed between adjacent pixel electrodes 35C. Moreover, this is the same for the boundary of the area 52 and the area 53. Accordingly, the contour of the area 52 for maintaining display is not moved or broken, and the image can be maintained in the high-quality state.

Modified Example 3

Figure 10:
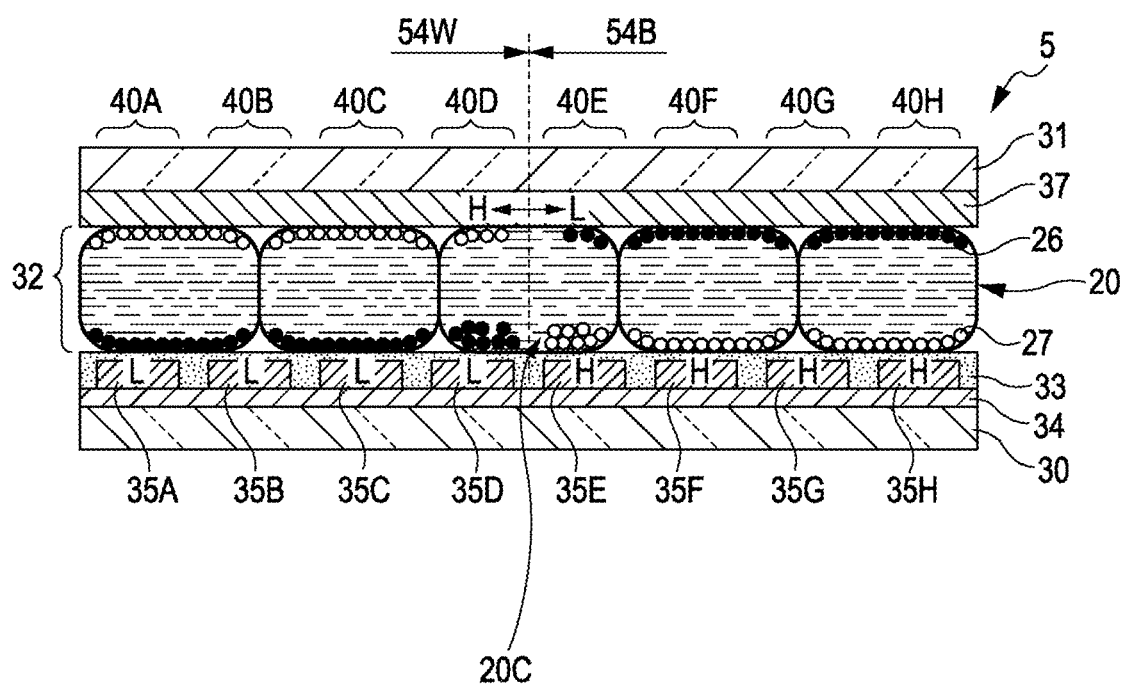
FIG. 10 is an explanatory diagram showing a cross section of an electrophoretic display device according to Modified Example 3.

In addition, according to the electrophoretic display device 100, an advantage that the electrophoretic elements 32 are driven in a form in which the afterimage cannot be easily generated at a time when a new image is displayed in the display unit 5 can be acquired. FIG. 10 is a diagram showing the electric potential state of the display unit 5 at a time when an image including a boundary of the black color and the white color is displayed.

In FIG. 10, states of the electrodes at a time when the white display is represented in an area 54W configured by pixels 40A to 40D, and the black display is represented in an area 54B configured by pixels 40E to 40H are shown. In other words, the low-level electric potential VL is input to the pixel electrodes 35A to 35D, and the high-level electric potential VH is input to the pixel electrodes 35E to 35H. To the common electrode 37, a pulse of a rectangle-shaped wave in which the high-level electric potential VH and the low-level electric potential VL are repeated at a predetermined period is input.

As described above, by inputting electric potentials to the electrodes, the electrophoretic element 32 is driven in accordance with an electric field that is generated based on the electric potential difference between the pixel electrode 35 and the common electrode 37. Here, when a boundary portion of the area 54W and the area 54B is focused, the boundary area between the pixel electrode 35D and the pixel electrode 35E is disposed within the plane area of the microcapsule 20C that is disposed on the upper side of the boundary area of the pixel electrodes 35D and 35E.

Accordingly, between the pixel electrode 35D and the pixel electrode 35E, an electric field of the horizontal direction is formed in accordance with an electric potential difference therebetween. Therefore, the electrophoretic particles located inside the microcapsule 20C are moved in the horizontal direction, and a same phenomenon as in the first image removing step ST13 occurs in the microcapsule 20C. Accordingly, between the area 54W in which the white display is represented and the area 54B in which the black display is represented, the white particles 27 and the black particles 26 are separated more clearly.

Therefore, spread of the black display (or the white display) up to an unintended area in the boundary between the pixel 40 in which the white display is represented and the pixel 40 in which the black display is represented, in accordance with the inclining electric field can be prevented. Accordingly, the afterimage cannot be generated easily.

In particular, when the display exudes in accordance with the inclining electric field, for example, in a case where the white display for the entire display unit 5 is performed from a state shown in FIG. 10, a black displayed portion remains in the boundary between the area 54W and the area 54B. Accordingly, the contour of the black portion of the previous image becomes the afterimage to be recognized visually. On the contrary, in the electrophoretic display device 100, the white particles 27 and the black particles 26 are separated well in the boundary of the area 54W in which the white display is represented and the area 54B in which the black display is represented, and thereby exudation of display can be prevented. Accordingly, generation of the afterimage can be prevented effectively.

According to an embodiment of the invention, the plane dimensional relationship between the pixel electrode 35 and the microcapsule 20 is defined, and accordingly, the boundary areas between the pixel electrodes 35 are included within many microcapsules 20. Accordingly, in displaying any arbitrary image, the above-described advantage can be acquired.

Modified Example 4

In the above-described embodiment, the electrophoretic display device 100 including the pixel circuit shown in FIG. 2 has been described. However, the configuration of the pixel circuit of the electrophoretic display device 100 is not limited to the example shown in FIG. 2.

Figure 11A:
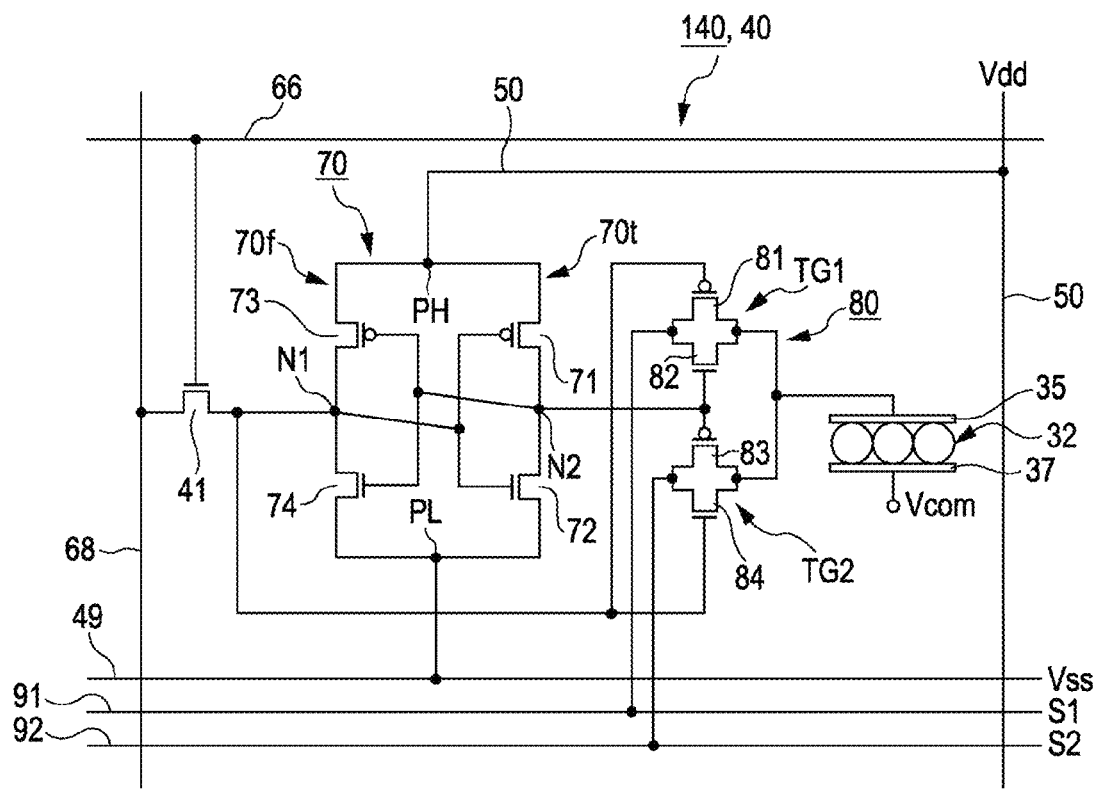
FIGS. 11A and 11B are diagrams showing a pixel circuit according to Modified Example 4.
Figure 11B:
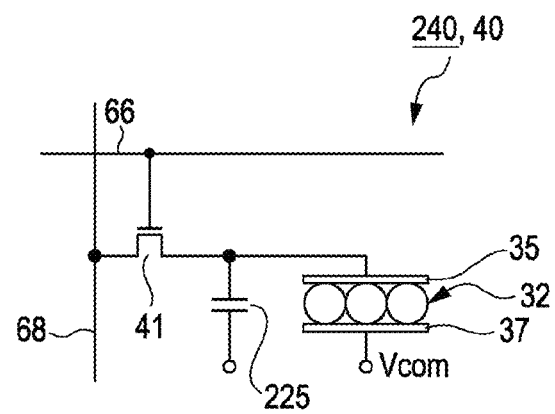

FIGS. 11A and 11B are diagrams showing examples of different pixel circuits that can be used in the electrophoretic display device 100.

The pixel 140 shown in FIG. 11A includes a switching circuit 80 between a latch circuit 70 and a pixel electrode 35, and a configuration in which a first control line 91 and a second control line 92 that are global wirings are connected to the switching circuit 80 is used. The first and second control lines 91 and 92, for example, are connected to the common power source modulating circuit 64 shown in FIG. 1. The first and second control lines 91 and 92 can be controlled at an arbitrary electric potential including the high impedance state.

The switching circuit 80 includes a first transmission gate TG1 and a second transmission gate TG2.

The first transmission gate TG1 is composed of a P-MOS transistor 81 and an N-MOS transistor 82. Source terminals of the P-MOS transistor 81 and N-MOS transistor 82 are connected to the first control line 91, and drain terminals of the P-MOS transistor 81 and N-MOS transistor 82 are connected to the pixel electrode 35. A gate terminal of the P-MOS transistor 81 is connected to the data input terminal N1 of the latch circuit 70, and a gate terminal of the N-MOS transistor 82 is connected to the data output terminal N2 of the latch circuit 70.

The second transmission gate TG2 is composed of a P-MOS transistor 83 and an N-MOS transistor 84. Source terminals of the P-MOS transistor 83 and N-MOS transistor 84 are connected to the second control line 92, and drain terminals of the P-MOS transistor 83 and N-MOS transistor 84 are connected to the pixel electrode 35. A gate terminal of the P-MOS transistor 83 is connected to the data output terminal N2 of the latch circuit 70 and a gate terminal of the N-MOS transistor 84 is connected to the data input terminal N1 of the latch circuit 70.

In a case where the image signal with a low level L (pixel data "0") is memorized in the latch circuit 70 and a signal with a high level H is output from the data output terminal N2, the first transmission gate TG1 becomes ON state and therefore a potential S1 supplied via the first control line 91 is input to the pixel electrode 35.

Conversely, in a case where the image signal with a high level H (pixel data "1") is memorized in the latch circuit 70 and a signal with a low level L is output from the data output terminal N2, the second transmission gate TG2 becomes ON state and therefore a potential S2 supplied via the second control line 92 is input to the pixel electrode 35.

In the electrophoretic display device 100 including the pixel 140 shown in FIG. 11A, the electrophoretic element 32 is driven based on an electric potential difference between electric potentials S1 and S2 input to the pixel electrodes 35 and the electric potential Vcom of the common electrode 37, and thereby an image can be displayed in the display unit 5.

By using the configuration in which the pixel 140 is included, the first and second image removing steps ST13 and ST14 can be performed more simply and quickly.

In particular, the pixel 140 can directly control the electric potential of the pixel electrode 35 by controlling the electric potentials S1 and S2 of the first and second control lines 91 and 92. Thus, when the process proceeds from the first image removing step ST13 to the second image removing step ST14, by only switching the electric potentials of the first control line 91 and the second control line 92, the electric potential of the pixel electrode 35 can be inverted. Accordingly, input of an image signal to the pixel 140 in the second image removing step ST14 is not needed. Therefore, image removal can be performed in a speedy manner, and power consumption of the scanning line driving circuit 61 and the data line driving circuit 62 can be suppressed.

Next, a pixel 240 shown in FIG. 11B includes a selection transistor 41, a capacitor 225, a pixel electrode 35, an electrophoretic element 32, and a common electrode 37. In other words, the pixel 240 has a configuration in which a DRAM (1T1C) type pixel circuit is included. When the pixel 240 is used, the power source wirings (the high-electric potential power source line 50 and the low-electric potential power source line 49) of the latch circuit 70 shown in FIG. 2 are not needed.

Even when the electrophoretic display device 100 has the configuration in which the pixel 240 is included, image removal can be performed assuredly and efficiently by applying the driving method according to the above-described embodiment. Accordingly, high-quality display can be acquired.

Electronic Apparatus

Next, cases where the electrophoretic display devices 100 to 400 according to each of the above-described embodiment are applied to an electronic apparatus will be described.

Figure 12:
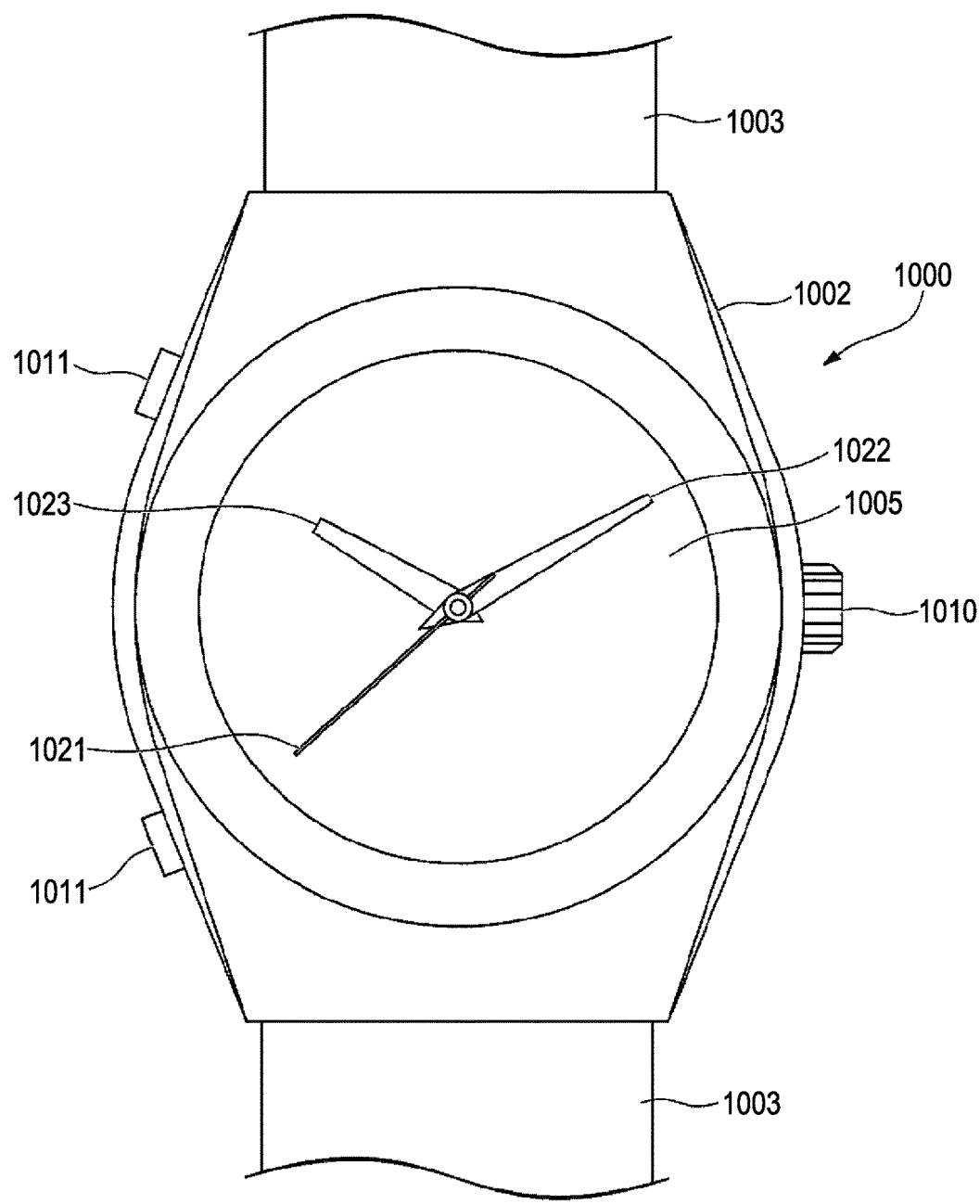
FIG. 12 is a front view of a wrist watch as an example of an electronic apparatus.

FIG. 12 is a front view of a wrist watch 1000. The wrist watch 1000 includes a watch case 1002 and a pair of bands 1003 connected to the watch case 1002.

In the front side of the watch case 1002, a display unit 1005 that is configured by the electrophoretic display device 100 according to each of the above-described embodiments, a second hand 1021, a minute hand 1022, and an hour hand 1023 are disposed. In addition, on the side of the watch case 1002, a winder 1010 as an operator, and an operation button 1011 are disposed. The winder 1010 is connected to a hand setting stem (not shown) disposed inside the case and is provided such that the winder, together with the hand setting stem, can be pushed or pulled at multiple levels (for example, two levels) and rotated. In the display unit 1005, an image that becomes the background, a character string such as date, time, or the like, a second hand, a minute hand, an hour hand, and the like can be displayed.

Figure 13:
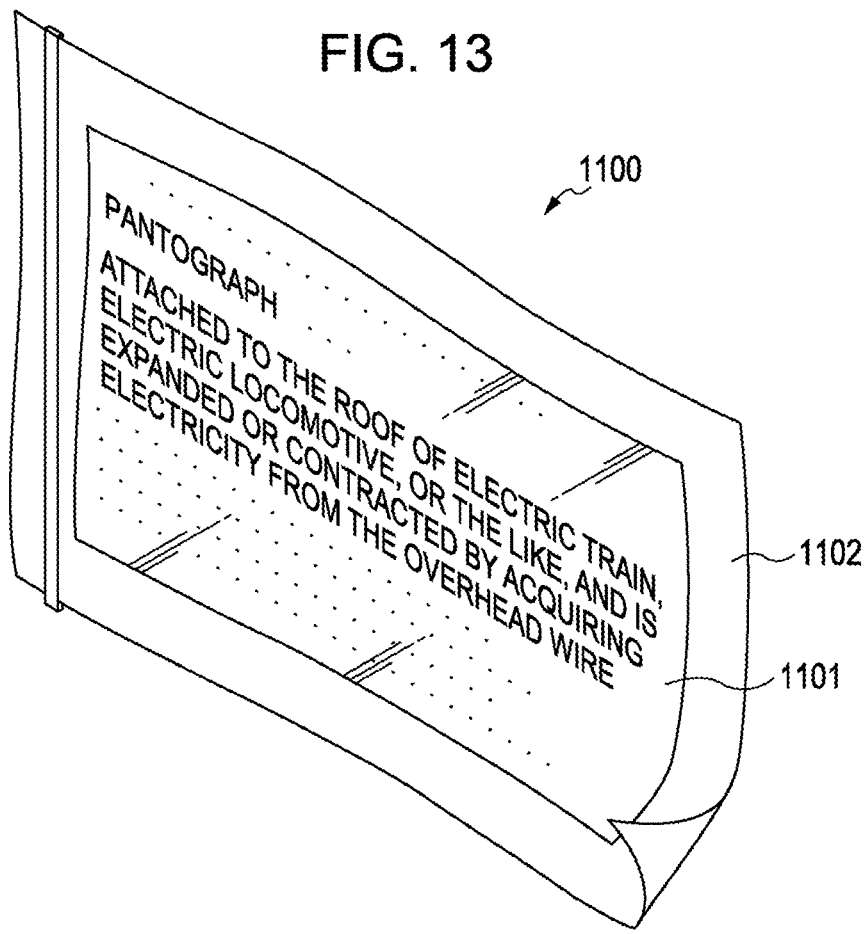
FIG. 13 is a perspective view of an electronic paper apparatus as an example of an electronic apparatus.

FIG. 13 is a perspective view showing the configuration of an electronic paper apparatus 1100. The electronic paper apparatus 1100 includes the electrophoretic display device 100 according to each of the above-described embodiments in a display area 1101. The electronic paper apparatus 1100 has flexibility and is configured to include a main body 1102 formed of a re-writable sheet having same texture and flexibility as those of a general paper sheet.

Figure 14:
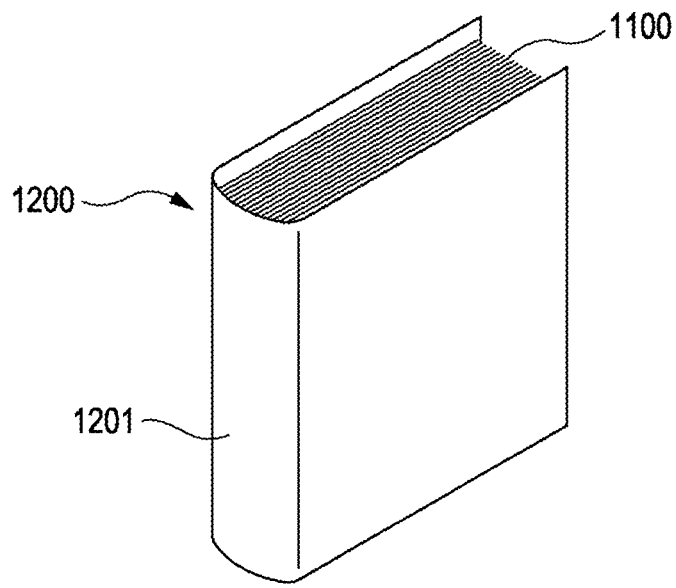
FIG. 14 is a perspective view of an electronic notebook as an example of an electronic apparatus.

FIG. 14 is a perspective view showing the configuration of an electronic notebook 1200. The electronic notebook 1200 is formed by binding a plurality of the electronic paper apparatuses 1100 and inserting the electronic paper apparatuses into a cover 1201. The cover 1201 includes a display data inputting unit that receives display data not shown in the figure, for example, transmitted from an external apparatus. Accordingly, the display content of the electronic paper apparatuses can be changed or updated in a state that the electronic paper apparatuses are bound in accordance with the display data.

According to the wrist watch 1000, the electronic paper apparatus 1100, and the electronic notebook 1200, the electrophoretic display device 100 according to an embodiment of the invention is employed, and therefore the electronic apparatuses have display units each having a superior displaying quality.

In addition, the electronic apparatuses are examples of electronic apparatuses according to embodiments of the invention and do not limit the technical scope of the invention. For example, the electrophoretic display device according to an embodiment of the invention can be appropriately used in a display unit of an electronic apparatus such as a cellular phone, a mobile audio apparatus, or the like.

The entire disclosure of Japanese Patent Application No. 2008-166974, filed Jun. 26, 2008 is expressly incorporated by reference herein.

What is claimed is:

1. A method of driving an electrophoretic display device, the electrophoretic display device including:
   a first substrate;
   a second substrate opposed to the first substrate;
   a plurality of microcapsules including electrophoretic particles, the plurality of microcapsules being arranged between the first substrate and the second substrate;

a plurality of first electrodes formed on the plurality of microcapsules side of the first substrate, the plurality of first electrodes being arranged at a pitch equal to or smaller than an average diameter of the plurality of microcapsules in at least one direction; and a second electrode formed on the plurality of microcapsules side of the second substrate, the second electrode being opposed to the plurality of first electrodes, wherein one or a plurality of the first electrodes are set as a driving unit, and the method comprising:

during removing a displayed image, making the second electrode be under an electrically isolated condition; and applying electric potentials to the plurality of the first electrodes such that the driving units adjacently located in at least one direction have different electric potentials during the removing of the displayed image.

2. The method according to claim 1, wherein the removing of the displayed image includes:

applying a first electric potential to the first electrodes belonging to some driving units of the plurality of the driving units and applying a second electric potential to the first electrodes belonging to the other driving units; and switching the first electric potential and the second electric potential to be applied to the first electrodes belonging to the driving units.

3. The method according to claim 1, wherein some first electrodes of the plurality of the first electrodes are in an electrically isolated condition in the removing of the displayed image.

4. The method according to claim 1, wherein the driving unit is set such that the area of the driving unit is larger than 0.25 times an average plane area of the microcapsules and is equal to or smaller than the average plane area.

5. The method according to claim 1, wherein the driving unit is set such that a shortest pitch of the driving units is larger than 0.5 times an average diameter of the microcapsules and is equal to or smaller than the average diameter.

6. The method according to claim 1, wherein the pitch includes a width of a first electrode and a width of a boundary area formed between the first electrode and an adjacent electrode on a side of the first electrode in the at least one direction.

7. The method according to claim 1, wherein the electric potentials applied to the plurality of the first electrodes are set to form an electric field in the horizontal direction between the driving units adjacently located in the at least one direction.

8. The method according to claim 7, wherein the electric field in the horizontal direction is formed in a portion of the boundary area.

9. An electrophoretic display device comprising:
a first substrate;
a second substrate opposed to the first substrate;
a plurality of microcapsules including electrophoretic particles, the plurality of microcapsules being arranged between the first substrate and the second substrate;
a plurality of first electrodes formed on the plurality of microcapsules side of the first substrate, the plurality of first electrodes being arranged at a pitch equal to or smaller than an average diameter of the plurality of microcapsules in at least one direction;
a second electrode formed on the plurality of microcapsules side of the second substrate, the second electrode being opposed to the plurality of first electrodes; and
a control unit that controls electric potentials of the plurality of first electrodes and the second electrode,
wherein the control unit, during an image removing period in which a displayed image is removed, controls the second electrode to be in an electrically isolated condition, sets one or a plurality of the first electrodes as one driving unit, and applies electric potentials to the plurality of the first electrodes such that the driving units adjacent to each other in at least one direction have different electric potentials during the image removing period.

10. The electrophoretic display device according to claim 9, wherein an average plane area of the microcapsules is equal to or larger than the area of the driving unit and is smaller than four times the area of the driving unit.

11. The electrophoretic display device according to claim 9, wherein the average diameter of the microcapsule is equal to or larger than a shortest pitch of the driving units and is smaller than twice the shortest pitch.

12. The electrophoretic display device according to claim 9, wherein the image removing period includes:
a period in which a first electric potential is applied to the first electrodes belonging to some driving units of the plurality of driving units and a second electric potential is applied to the first electrodes belonging to the other driving units; and
a period in which the first electric potential and the second electric potential to be applied to the first electrodes belonging to the driving units are switched.

13. The electrophoretic display device according to claim 9, wherein, in the image removing period, the control unit controls some first electrodes of the plurality of first electrodes to be in an electrically isolated condition.

14. An electronic apparatus comprising the electrophoretic display device according to claim 9.

15. The electrophoretic display device according to claim 9, wherein the pitch includes a width of a first electrode and a width of a boundary area formed between the first electrode and an adjacent electrode on a side of the first electrode in the at least one direction.

* * * * *